(12) United States Patent
Borlick

(10) Patent No.: US 7,376,792 B2
(45) Date of Patent: May 20, 2008

(54) VARIABLE CACHE DATA RETENTION SYSTEM

(75) Inventor: Matthew G Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 11/205,808

(22) Filed: Aug. 17, 2005

(65) Prior Publication Data

US 2007/0043905 A1 Feb. 22, 2007

(51) Int. Cl.
*G06F 12/00* (2006.01)
(52) U.S. Cl. .............. 711/133; 711/134; 711/156; 711/159; 711/221
(58) Field of Classification Search ........ 711/118–146, 711/156, 159, 221
See application file for complete search history.

(56) References Cited

U.S. PATENT DOCUMENTS

| | | | |
|---|---|---|---|
| 5,787,471 A | 7/1998 | Inoue et al. | |
| 5,943,687 A | 8/1999 | Liedberg | |
| 6,272,598 B1 | 8/2001 | Arlitt et al. | |
| 6,408,362 B1 | 6/2002 | Arimilli et al. | |
| 6,742,084 B1 | 5/2004 | Defouw et al. | |
| 6,785,770 B2 | 8/2004 | Hoogerbrugge et al. | |
| 2002/0049889 A1* | 4/2002 | Hoogerbrugge et al. | .... 711/134 |

* cited by examiner

*Primary Examiner*—Stephen C Elmore
(74) *Attorney, Agent, or Firm*—Dan Shifrin

(57) ABSTRACT

A customizable cache discard policy is provided which reduces adverse consequences of conventional discard policies. In a data processing system, a cache controller invokes a cache data discard policy as the cache approaches its capacity. Using one possible policy, data having the shortest retrieval (fetch) time is discarded before data having longer retrieval times. In an alternative policy, data may be discarded based upon its source. Weightings may be applied based upon the distance from each source to the cache, may be based upon priorities assigned to each source, or may be based upon the type of each source.

13 Claims, 1 Drawing Sheet

VARIABLE CACHE DATA RETENTION SYSTEM

TECHNICAL FIELD

The present invention relates generally to data processing and, in particular, to policies for determining when cached data is to be discarded.

BACKGROUND ART

In a typical data processing system, data to be processed is read from an inexpensive but low speed data source and placed into a relatively expensive but high speed cache. When the data is again required, the processor first looks to the cache and, if the data is present, the processor retrieves the data rapidly. If the data is no longer in the cache, the processor must fetch it from the data source. To avoid retrieval delays, therefore, it is preferable to maintain as much data as possible in the cache. However, the capacity of the cache is limited and data is discarded periodically or when the cache approaches full capacity. A commonly used policy discards the least recently used (LRU) data first on the assumption that the more recently used data is more likely to be needed first. Another commonly used policy discards the oldest data first (first in, first out or FIFO) on the assumption that such data is least likely to be needed.

However, most conventional cache discard policies, such as the LRU policy, do not take into account that not all data takes the same amount of time to retrieve. One policy which addresses this issue is proposed in commonly-assigned U.S. Pat. No. 6,408,362 in which recently (and possibly frequently) used data, which has a very short access latency (fetch time), is discarded in favor of retaining less recently used data, which has a much longer access latency.

In addition to fetch latencies, data from different sources may have different processing priorities. Thus, when a processing node is being used to process both local and remote data, the application processing the local data (executing wire transfers for a bank) may be more important than the application processing the remote data (updating the bank's employee records). However, both an LRU discard policy and a latency-based policy may favor retaining the less important remote data in cache at the expense of the higher priority local data.

SUMMARY OF THE INVENTION

The present invention provides a customizable cache discard method. The method includes assigning a weighting value to each of a plurality of data sources, receiving data from the data sources, storing the data in a cache, and upon the cache reaching a predetermined capacity level, implementing a data discard policy whereby data from a data source having a first weighting value is retained in the cache longer than data from a data source having a lower weighting value. Weighting may be assigned based upon data source categories, such as geographic locations. Weighting may also be assigned based upon data source type, such as DASD storage, tape storage, main memory, cache memory and network nodes.

The present invention also provides a customizable cache system. The system includes a cache storage operable to store data from a plurality of data sources, a lookup table configured to store an entry for each data source and an associated weighting value, and a cache manager configured to implement a cached data discard policy whereby, upon the cache storage reaching a predetermined capacity level, data from a data source having a first weighting value is retained in the cache longer than data from a data source having a lower weighting value. Weighting may be assigned based upon data source categories, such as geographic locations. Weighting may also be assigned based upon data source type, such as DASD storage, tape storage, main memory, cache memory and network nodes.

The present invention further provides a computer program product of a computer readable medium usable with a programmable computer. The computer program product includes computer-readable code embodied therein for selecting data to be discarded from a cache. The computer-readable code includes instructions for assigning a weighting value to each of a plurality of data sources, receiving data from the data sources, storing the data in a cache, and upon the cache reaching a predetermined capacity level, implementing a data discard policy whereby data from a data source having a first weighting value is retained in the cache longer than data from a data source having a lower weighting value.

DETAILED DESCRIPTION OF THE PREFERRED EMBODIMENT

Figure 1:
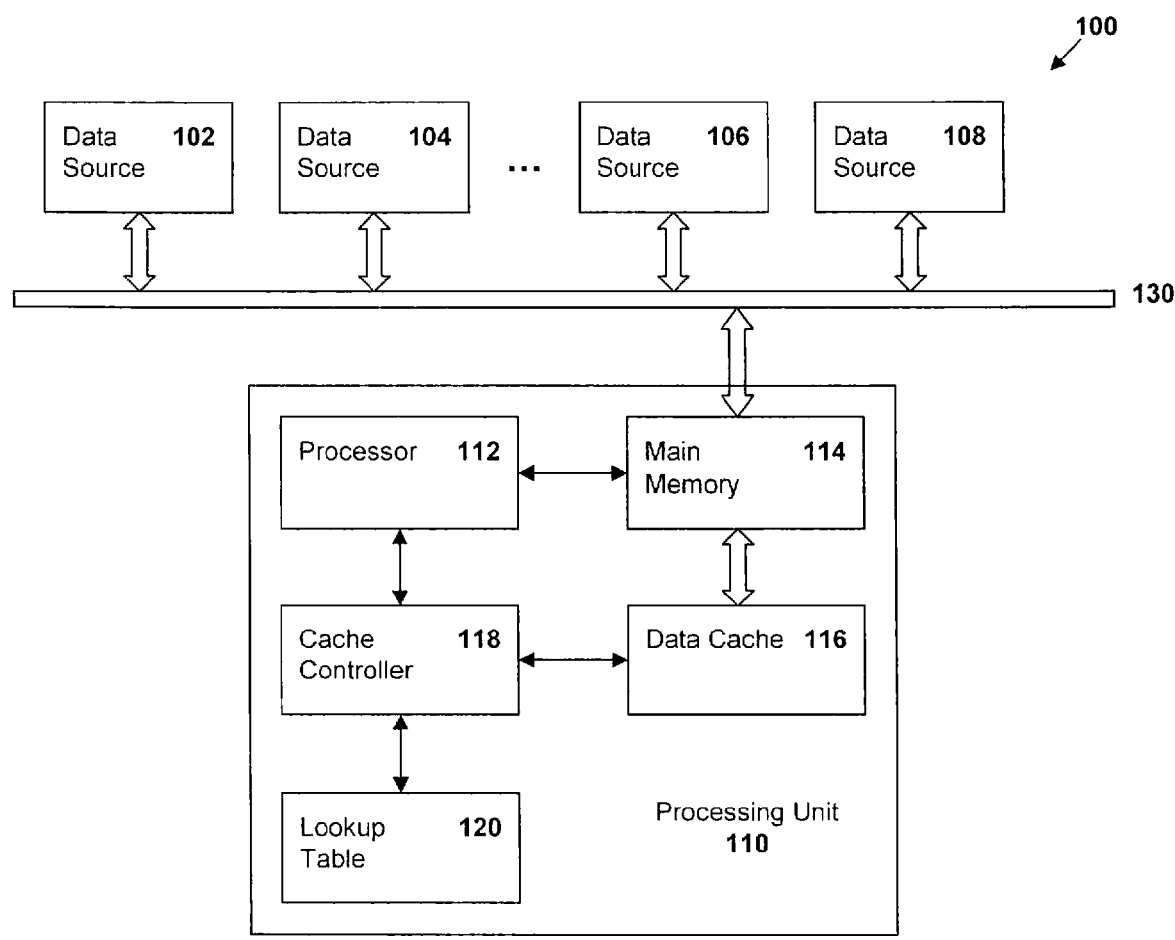
FIG. 1 is a block diagram of a data processing environment in which the present invention may be implemented.

FIG. 1 is a block diagram of a data processing system 100 in which the present invention may be implemented. The system 100 includes a plurality of data sources or "cells", four of which 102, 104, 106, 108 are included in the Fig. as being representative of all data sources. The system 100 further includes a processing unit 110 to which the data sources 102, 104, 106, 108 are coupled through a bus, network, internet, other comparable means or a combination of any such means 130. The processing unit 110 includes a processor 112, main memory 114, a data cache 116 and a cache controller 118. In FIG. 1, single arrows represent command and instruction paths and double arrows represent data paths. Data received from a data source 102, 104, 106 or 108 is placed in the main memory 114 for processing and, under the cache controller 118, also copied to the cache 116. When the processor 112 later requests the same data, the contents of the cache 116 is first examined. If the requested data is present in the cache 116, it is copied to the main memory 114; otherwise the data is fetched from the originating data source 102, 104, 106 or 108. The cache 116 may be any type of cache, including (but not limited to) a separate high-speed data or processor cache, a disk cache, a memory cache or any combination thereof and the present invention is not limited to use with any particular type of cache.

As the cache 116 approaches its capacity, the cache controller 118 invokes a discard policy. For example, the policy may be invoked when the cache becomes 80% (or some other predetermined percentage) full or whenever it is too full to accommodate incoming data. Using one possible discard policy, the cache manager 118 logs the amount of time it takes for each requested data to be retrieved from the data source. When data is to be discarded from the cache 116, the cache controller 118 selects the data having the shortest retrieval time, leaving data with longer retrieval times in the cache.

In an alternative discard policy of the present invention, data may be classified based upon the location of its respective data source. For example, the processing unit 110 may be located in a first geographic location, such as San Jose, Calif., one data source 102 may also be located in the first location, a second data source 104 may be located in Tucson, Ariz., a third data source 106 may be located in Austin, Tex., and a fourth data source 108 may be located in Poughkeepsie (POK), N.Y. The cache controller 118 stores the data source locations in a lookup table 120 or other comparable data structure along with an assigned weight. Data from the data source with the lowest weight in the lookup table will be discarded from the cache 116 first while data from the source with the highest weight will be retained the longest. It will be appreciated that the weighting scale may be reversed such that data from a data source with the highest weight in the lookup table will be discarded from the cache 116 first while data from the source with the lowest weight will be retained the longest.

In one configuration, the weighting is based on the distance of the data source from the processing unit 110 such that data from those data sources which are farther away are assigned higher weight values than data from those which are closer.

In another configuration, the weighting is based on priorities assigned to the data sources. For example, processing of data from the local San Jose data source 102 may be more important than data from any other data source and be assigned the highest weight, while processing from the Austin data source 106 may be the least important and be assigned the lowest weight. Thus, data from the San Jose data source 102 will be retained in the cache 116 the longest, even though its data may be fetched the quickest, while data from the Austin data source 106 will be discarded first, even though its data may take the longest time to fetch.

In a variation of the latter configuration, the data sources are classified by type and weightings assigned by type. Data source types may include DASD, main memory, cache memory, tape media, or network.

When any of the configurations are used, the weight values may be calculated automatically by the cache controller 118 or by a system administrator. Moreover, configurations may be combined if desired. For example, the weight value assigned to data by one method may be added to the weight value assigned to data by another method and the resulting sum used to compare with the summed weights of other data when determining what data to discard from the cache 116.

If the cache controller 118 only discards cache data by using weight values in accordance with one or a combination of the above configurations, it is possible that some data with a very high weight will remain in the cache 116 indefinitely, even after it is no longer needed. Therefore, it is preferable that all data eventually be discarded if it is no longer being used. One method for accomplishing a mandatory discard is for the weight of data to be decreased slightly each time other data is discarded from the cache 116. If a particular data is accessed again while in the cache 116, its weight may be restored to its originally assigned (default) value.

EXAMPLES

The following provide examples of the present invention as implemented in a DFS file system on an AIX host. However, the present invention may also be implemented on most operating systems (e.g., AIX, Windows, etc.) and with most file systems (e.g., DFS, AFS, GSA, etc.).

1) After the file system (such as DFS) is installed or updated, a user configures additional fields to turn on or off Variable Cache Data Retention (VCDR).

2) If VCDR is turned on, the user selects one of following. This selection will be used to augment the default method used by the file system to determine which data to retain and which data to discard from the cache 116:
   2a) Use only "User Defined weights";
   2b) Use only "Temporal Data Acquisition" characteristics; or
   2c) Use combination of 2a and 2b.

3a) The user then defines relative "User Defined Weight Values", for example, between 1 and 10, where:
   10 represents the most critical data and is to be kept as long as possible;
   5 represents average data which is not discriminated against or given preferential treatment; and
   1 represents the least critical data and is to be discarded first.

It will be appreciated that the actual range of values may be optimized for the specific system in which the present invention is implemented; for simplicity, a range of 1 to 10 is used herein.

3b) The user assigns a weight for each data source or "foreign cell" to which the file system is connected. For example, if the processing unit is based in San Jose and is connected to 2 remote cells, the user may assign User Defined Weight Values as:
   Austin=10
   San Jose=5
   POK=2

4) After the file system has been configured, the above configuration parameters are stored in the lookup table 120 or other comparable data structure. When the system is then running, and if option 2b or 2c has been selected, the cache controller 118 maintains runtime statistics on average case time to read (and/or write) data from remote cells. The statistics may be represented in the lookup table 120 in the processing unit 110 with an entry for each cell. The data may be represented as a normalized weighted value from 1-10, with:
   10 representing the most (longest) time to access this data;
   5 representing the average time; and
   1 representing the quickest time to access this data.

Again, the actual range of temporal values is preferably optimized for the specific system in which the present invention is implemented, but for simplicity a range of 1 to 10 has been used herein. During actual operation of the system 100, actual data run time statistics may indicate:
   Austin=8
   San Jose=1
   POK=9

5) Assume that the cache controller 118 has been configured to use only "User Defined Weights" (2a) in determining which data to discard from the cache 116. If the cache controller 118 uses the LRU discard method to determine which data to discard and the Least Recently Used items in the cache 116 are from Austin and POK, the data from POK would typically be discarded since POK has been assigned a weight of 2 while Austin has been assigned a weight of 10 (2POK<10Austin). As noted above, it would not be advantageous to maintain a specific piece of data in the cache 116 indefinitely merely because it always scores better than other data. Rather, each time a specific element of data is "saved" from being discarded from the cache 116, its relative weight is preferably decreased slightly. In the above example, because the Austin data element was saved from being discarded, its weight is decreased, such as from 10 to 9. The amount of the decrease may be optimized for the specific system in which the present invention is implemented. The next time data is to be discarded, this data element is more likely to be cast out. However, if this Austin data element is accessed again, its weight is preferably reset to the default value of 10. Similar dynamic adjustments may also be applied when (2b) or (2c) are selected.

6) Assume now that the cache controller 118 has instead been configured to use only "Temporal Data Acquisition" (2b) in determining which data to discard from the cache 116. If the cache controller 118 uses a FIFO (First In First Out) discard policy to determine which data to discard from the cache 116, the cache controller 118 may indicate that the next items in the cache 116 that are to be discarded are from Austin and POK. Combined with the "Temporal Data Acquisition" (2b) selection, the data from Austin would be discarded because POK has a temporal weight of 9 while Austin has a weight of 8 (8Austin<9POK).

7) As another example, if the cache controller 118 has been configured to use a combination of 2a and 2b (2c) when determining which data to discard. Data in the cache 116 are from:

Austin=10+8; and
POK=9+2.

In this situation, the data from POK would be cast out of cache because POK has a weight which is less than that of Austin's (11POK<18 Austin).

In the last example, the Temporal Weight was added to the User Defined Weight. However, a combination may occur in many other ways, such as an average, a weighted average (whereby more weight is given to one value or the other) or any other mathematical combination of values.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution.

Examples of computer readable media include recordable-type storage media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for managing the discarding of cache data.

What is claimed is:

1. A method for selecting data to be discarded from a cache, comprising:
   assigning a non-latency based weighting value to each of a plurality of data sources;
   receiving data from the data sources;
   storing the data in a cache; and
   upon the cache reaching a predetermined capacity level, implementing a data discard policy whereby data from a data source having a first weighting value is retained in the cache longer than data from a data source having a lower weighting value.

2. The method of claim 1, wherein assigning each non-latency based weighting value comprises assigning a weighting value according to the geographic location of each of the data sources.

3. The method of claim 2, wherein a data source having the first weighting value is geographically more distant from the cache than a data source having the lower weighting value.

4. The method of claim 1, wherein assigning each non-latency based weighting value comprises assigning the weighting value according to a predetermined priority of data received from each data source.

5. The method of claim 4, wherein first data received from a data source having the first weighting value has a higher priority than second data received from a data source having a lower weighting value.

6. The method of claim 1, further comprising:
   maintaining a log of the time required to receive data from each of the data sources;
   assigning to a data source a second weighting value corresponding to the time required to receive data from the data source relative to the time required to receive data from each of the other data sources; and
   adding the first and second weighting values to obtain a combined weighting value for each data source, whereby upon the cache reaching a predetermined capacity level, implementing a data discard policy whereby first data from a data source having a first combined weighting value is retained in the cache longer than second data from a data source having a second combined weighting value.

7. The method of claim 1, further comprising, after retaining first data in the cache, decreasing its weighting value by a predetermined amount to decrease the chance that the first data will be retained in the cache when the cache next reaches the predetermined capacity level.

8. A computer program product of a computer readable medium usable with a programmable computer, the computer program product having computer-readable code embodied therein for selecting data to be discarded from a cache, the computer-readable code comprising instructions for:
   assigning a non-latency based weighting value to each of a plurality of data sources;
   receiving data from the data sources;
   storing the data in a cache; and
   upon the cache reaching a predetermined capacity level, implementing a data discard policy whereby data from a data source having a first weighting value is retained in the cache longer than data from a data source having a lower weighting value.

9. The computer program product of claim 8, wherein the instructions for assigning each non-latency based weighting value comprise instructions for assigning a weighting value according to the geographic location of each of the data sources.

10. The computer program product of claim 9, wherein a data source having the first weighting value is geographically more distant from the cache than a data source having the lower weighting value.

11. The computer program product of claim 8, wherein:
first data received from a data source having the first weighting value has a higher priority than second data received from a data source having a lower weighting value; and
the instructions for assigning each non-latency based weighting value comprise instructions for assigning the weighting value according to a predetermined priority of data received from each data source.

12. The computer program product of claim 8, further comprising instructions for:
maintaining a log of the time required to receive data from each of the data sources;
assigning to a data source a second weighting value corresponding to the time required to receive data from the data source relative to the time required to receive data from each of the other data sources; and
adding the first and second weighting values to obtain a combined weighting value for each data source, whereby upon the cache reaching a predetermined capacity level, implementing a data discard policy whereby first data from a data source having a first combined weighting value is retained in the cache longer than second data from a data source having a second combined weighting value.

13. The computer program product of claim 8, further comprising instructions for, after retaining first data in the cache, decreasing its weighting value by a predetermined amount to decrease the chance that the first data will be retained in the cache when the cache next reaches the predetermined capacity level.

* * * * *